United States Patent [19]
Sze et al.

[11] 3,922,147
[45] Nov. 25, 1975

[54] HYDROLYSIS REACTOR

[75] Inventors: Morgan C. Sze, Upper Montclair; Benjamin J. Luberoff, Summit, both of N.J.

[73] Assignee: The Lummus Company, Bloomfield, N.J.

[22] Filed: Apr. 5, 1974

[21] Appl. No.: 458,199

[52] U.S. Cl. .................... 23/283; 23/285; 261/114
[51] Int. Cl.² .................. B01D 47/12; B01J 10/00; C07C 63/26
[58] Field of Search ...... 23/283, 285, 288 E, 288 R; 261/114 R

[56] References Cited
UNITED STATES PATENTS

| | | | |
|---|---|---|---|
| 1,499,898 | 7/1924 | Wolf | 23/283 X |
| 2,477,454 | 7/1949 | Heath | 23/283 X |
| 2,705,216 | 3/1955 | Drew | 23/288 G X |
| 2,762,683 | 9/1956 | Massey | 23/283 UX |
| 3,075,580 | 1/1963 | Davis, Jr. | 23/283 X |
| 3,102,787 | 9/1963 | McMillan et al. | 23/285 X |
| 3,505,018 | 4/1970 | Bawa et al. | 23/288 R X |
| 3,730,690 | 5/1973 | McCarthy et al. | 261/114 R X |
| 3,746,515 | 7/1973 | Friedman | 23/288 R |
| 3,784,628 | 1/1954 | Chapman | 23/285 X |

Primary Examiner—Morris O. Wolk
Assistant Examiner—Michael S. Marcus
Attorney, Agent, or Firm—Richard J. Halton; Michael Klotz; Alice L. Chen

[57] ABSTRACT

Apparatus for hydrolysis of a phthalonitrile and stripping of ammonia from the reaction products comprising a vertical reactor divided by a substantially horizontal baffle into upper and lower reaction chambers, with a draft tube extending from the lower portion of the lower reaction chamber to the upper portion of the upper reaction chamber. The nitrile to be hydrolyzed, together with water is introduced into the lower chamber, and after reaching the lower portion of this chamber is forced upwards by autogenous pressure through the draft tube to the upper chamber, in which ammonia is stripped from the hydrolysis mixture by steam or other suitable inert gas.

3 Claims, 1 Drawing Figure

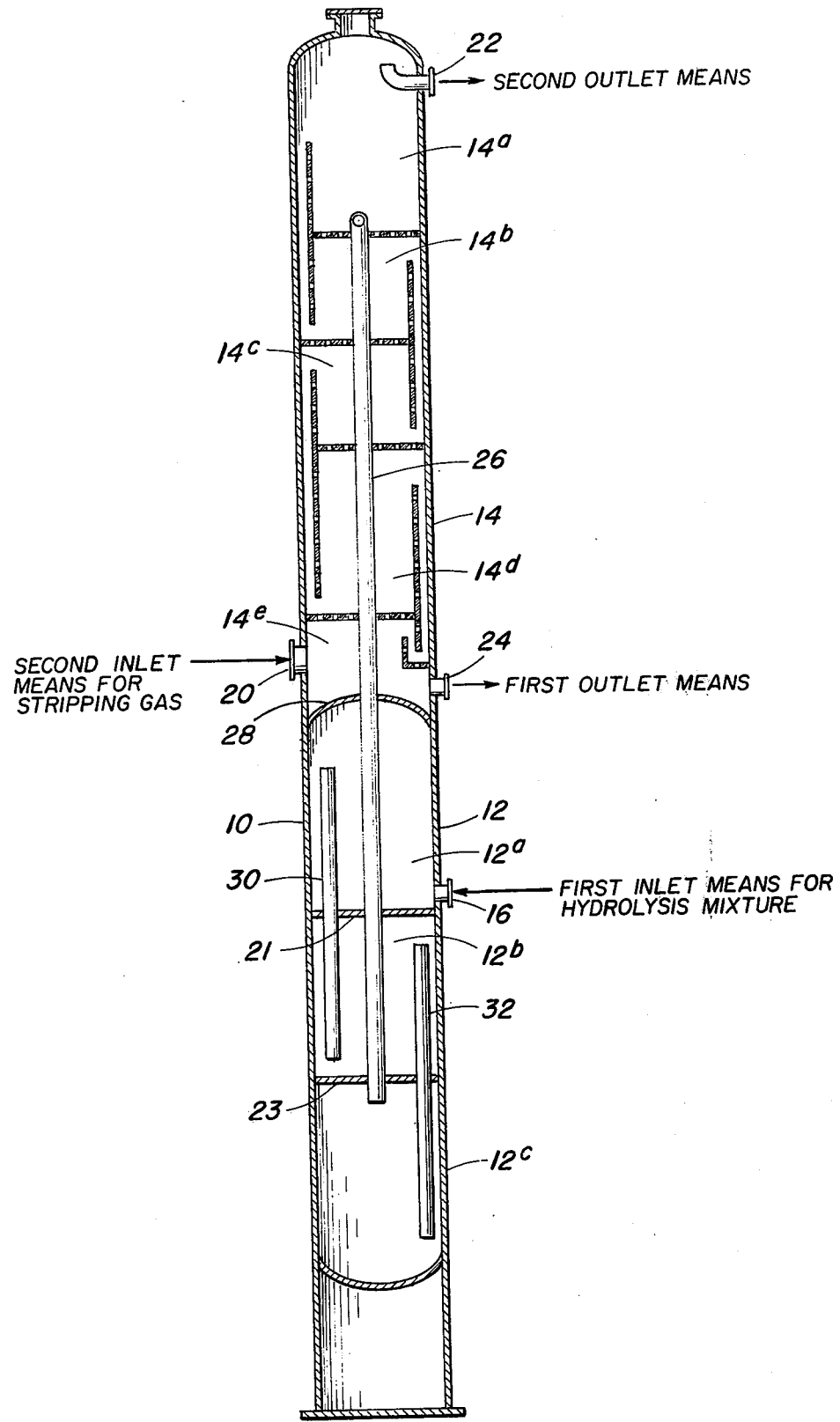

HYDROLYSIS REACTOR

BACKGROUND AND PRIOR ART

This invention relates to apparatus for conducting the aqueous hydrolysis of phthalonitriles and stripping of ammonia from the hydrolysis mixture. Processes of this type are disclosed, for example, Canadian Pat. No. 834,234, and copending U.S. application Ser. No. 178,382, filed Sept. 7, 1971 now U.S. Pat. No. 3,805,567, both of which are assigned to The Lummus Company, which is also the assignee of the present application.

In Canadian Pat. No. 834,234 for example, there is disclosed the single stage hydrolysis of phthalonitriles, such as terephthalonitrile, with countercurrent stripping of ammonia from the hydrolysis products by steam or another inert gas introduced into the lower portion of the reactor, to produce the corresponding carboxylic acid (e.g. terephthalic acid) which was then separated. The reaction is conducted in a vertical reactor, preferably internally divided into a plurality of compartments, with the nitrile and steam for hydrolysis introduced at the top of the reactor, and stripping gas introduced at the bottom. In U.S. application Ser. No. 178,382, the operation is similarly conducted but controlled so as to result in the production of the monoammonium salt of the acid e.g. monoammonium terephthalate.

The hydrolysis reaction, and stripping of the ammonia from the hydrolysis mixture, are conducted at temperatures of between about 250°F to about 600°F, preferably between about 250°F and about 530°F, and most preferably between about 350°F and about 480°F. It has been found, however, that high temperatures increase the rate of hydrolysis, whereas lower temperatures provide optimum steam economy during the stripping. When conducting the hydrolysis and stripping operations in one vertical column, a pressure gradient of as much as 5 atm may exist from top to bottom of the column. Since both vapor and liquid are coexistant in the column, there is an accompanying temperature differential such that the temperature in the bottom of the column is always higher than that in the upper portion. Therefore, it is necessary to conduct the stripping operation, which occurs primarily in the lower portion of the column, at a temperature higher than the hydrolysis, which occurs primarily in the upper portion of the column.

It is an object of the present invention to provide an apparatus for the combination hydrolysis of phthalonitriles and stripping of ammonia from the hydrolysis product. It is a further object of this invention to provide an apparatus for the hydrolysis of terephthalonitrile to terephthalic acid and/or monoammonium terephthalate, including stripping of ammonia from the hydrolysis mixture. A still further object of the present invention is to provide such an apparatus in which a more optimum temperature gradient is provided. Yet another object of this invention is to provide such an apparatus in which the hydrolysis may be conducted at optimally high temperatures and stripping of the ammonia may be conducted at optimally low temperatures.

SUMMARY OF THE INVENTION

In brief, the invention comprises apparatus for hydrolysis of phthalonitriles and stripping of ammonia from the hydrolysis mixture under pressure comprising:
 a vertical reactor;
 a substantially horizontal partition dividing the reactor into an upper chamber and a lower chamber, isolated from each other;
 first inlet means for introducing a mixture of water and the phthalonitrile into an upper portion of the lower chamber;
 second inlet means for introducing a stripping gas into a lower portion of the upper chamber;
 first outlet means for removing hydrolyzed and stripped product from the lower portion of the upper chamber;
 second outlet means for removing stripping gas and ammonia from the upper portion of the upper chamber; and
 a draft tube extending from the lower portion of the lower chamber to the upper portion of the upper chamber.

DETAILED DESCRIPTION OF THE INVENTION

The invention can be more specifically described by reference to the FIGURE, which represents one embodiment of apparatus constructed according to the invention.

As seen in the FIGURE, the apparatus comprises a vertical reactor, generally indicated as 10, divided by a partition 28 into an upper reaction chamber 14 and a lower reaction chamber 12. The partition 28 is shown in the FIGURE as being a curved partition, primarily to best serve to resist pressures developed in the lower reaction chamber 12. However, this partition may be any generally horizontal partition or baffle, whether essentially flat or curved in either direction, which serves to divide the reactor 10 into upper and lower chambers.

In the upper part of lower chamber 12 is situated an inlet 16 for introduction of the phthalonitrile to be hydrolyzed, together with water and/or steam. Generally speaking, the nitrile is introduced in the form of a slurry of nitrile in water. In column 12, the major portion of the hydrolysis of the nitrile to its corresponding ammonium salt is carried out, under autogenous pressure, which will vary according to the steam pressure and temperature and concentration of materials, but usually is between 65 and 885 psia. The slurry may also contain ammonia, as it has been found that the addition of ammonia in an amount of about 1 to 5 mol percent based on the water present in the total mixture results in a substantial increase in the rate of the hydrolysis reaction. Additionally, the hydrolysis mixture may contain recycled partially hydrolyzed products from a previous hydrolysis step. The hydrolysis reaction is conducted at temperatures of between about 250°F and about 600°F, preferably between about 250°F and about 530°F, and most preferably between about 350°F and about 480°F, and a residence time of 1 to 12 hours, preferably 3 to 8 hours. In order to assist in obtaining such a residence time, in a preferred embodiment lower chamber 12 is divided into three or more sections 12a, 12b, 12c, etc. in order to maintain the hydrolysis mixture in contact. As shown in this embodiment, the products can be transferred from one stage to the next by means of downflow tubes. For example, the hydrolysis mixture is introduced into subchamber 12a via inlet 16, and accumulates until it reaches the level of the top of downflow pipe 30, at which point it commences to flow through the pipe into the next chamber 12b. As hydrolysis continues and the mixture accumulates in subchamber 12b, it eventually attains a height equal to or above the top of the downflow pipe 32, and is conveyed via this pipe into the lower chamber 12c. Eventually, the accumulation of hydrolysis mixture 12c, and the autogenous pressure attained in the chamber will cause the hydrolysis mixture to be conveyed upwards through draft tube 26, which is mounted in partition 28 and is connected to the partitions 21, 23, etc. in a manner to permit movement of the tube resulting from thermal expansion.

The hydrolysis mixture is discharged from the top of tube 26 into the upper portion of the upper chamber 14 Preferably, shown in the FIGURE, chamber 14 is divided into a number of subchambers 14a through 14e, etc. by partitions as shown, forming floors and downcomers. Alternatively, downflow pipes as illustrated in the FIGURE in the lower chamber 12 can be utilized to transfer the mixture from subchamber to subchamber. A suitable stripping gas, which is inert with respect to the reactants and materials in the hydrolyzer and does not condense at the temperatures and pressures employed, is introduced through inlet 20 located in the lower portion of upper chamber 14, and countercurrently contacts the down-flowing hydrolysis mixture to remove ammonia therefrom. As shown in the FIGURE, the partitions are perforated or screened or otherwise made permeable for passage of stripping gas therethrough to contact the hydrolysis mixture. The preferred stripping gas is steam, however, other inert gases such as nitrogen, hydrocarbons such as methane, or propane, propylene and ethylene, and fluorocarbons such as the Freon series, may be utilized. Ammonia, both that generated by the hydrolysis reaction and that which may be introduced to assist in promoting the hydrolysis reaction, is stripped from the solution by countercurrent contacting with the stripping gas, and is removed with the stripping gas through outlet 22 at top of the reactor. The down-flowing hydrolysis mixture, now comprising essentially desired products (either terephthalic acid or monoammonium terephthalate or a mixture of the two) together with water, eventually reaches the lowest subchamber (14e in the FIGURE) and is withdrawn in outlet 24.

The use of apparatus of this type results in the pressure at the bottom of the column being equal to the sum of the vapor pressure at the hydrolysis temperature plus a hydrostatic head, which permits forcing the material up through the draft tube. In a preferred embodiment, the lower chamber 12 comprises no more than one-half of the volume of the reactor, thereby placing the inlet 16 for the phthalonitrile hydrolysis feed at a point in the lower one-half of the vertical hydrolyzer reactor. Thus, in this preferred embodiment, the hydrolysis mixture is introduced essentially near the bottom of the overall reactor and is raised to the top by autogenous pressure through the draft tube 26.

It should be noted that though the invention is described hereinabove with reference to the FIGURE, modifications other than those shown in the FIGURE will be readily apparent to those skilled in the art, and many such modifications or improvements may be utilized without departing from the principles of this invention. Consequently, the invention is not to be understood to be limited by this specification and FIGURE, but only by the claims which follow.

We claim:

1. Apparatus for the two-stage hydrolysis of nitriles and stripping of ammonia from the hydrolysis mixture under pressure comprising:

a vertical reactor;

a substantially horizontal imperforate partition dividing the reactor into an upper chamber and a lower chamber;

first inlet means for introducing a mixture of water and nitrile into an upper portion of the lower chamber;

second inlet means for introducing a stripping gas into a lower portion of the upper chamber;

first outlet means for removing hydrolyzed and stripped product from the lower portion of the upper chamber;

second outlet means for removing stripping gas and ammonia from the upper portion of the upper chamber;

the lower chamber being divided into a plurality of subchambers each sub-chamber being connected with the next lower sub-chamber by flow conduit means for transporting hydrolysis mixture from one sub-chamber to the next lower sub-chamber; the upper chamber being divided into a plurality of sub-chambers each sub-chamber provided with means allowing for counter-current contacting of the hydrolysis mixture with a stripping vapor; and a draft tube extending from the lowermost sub-chamber of the lower chamber to the uppermost sub-chamber of the upper chamber, said draft tube being the only connection between the lower chamber and the upper chamber, and said draft tube being the sole outlet for hydrolysis mixture from the lower chamber whereby said hydrolysis mixture from said first inlet means flows downwardly through the plurality of sub-chambers in said lower chamber, upwardly through said draft tube to the uppermost sub-chamber in the upper chamber and then downwardly through the plurality of sub-chambers in said upper chamber to said first outlet means, said downward flow of the hydrolysis mixture in the upper chamber being countercurrent to stripping gas entering said second inlet means.

2. Apparatus according to claim 1 in which the first inlet means is located in the lower half of the reactor.

3. Apparatus according to claim 1 in which the substantially horizontal imperforate partition comprises a curved partition.

* * * * *